Figure 1:
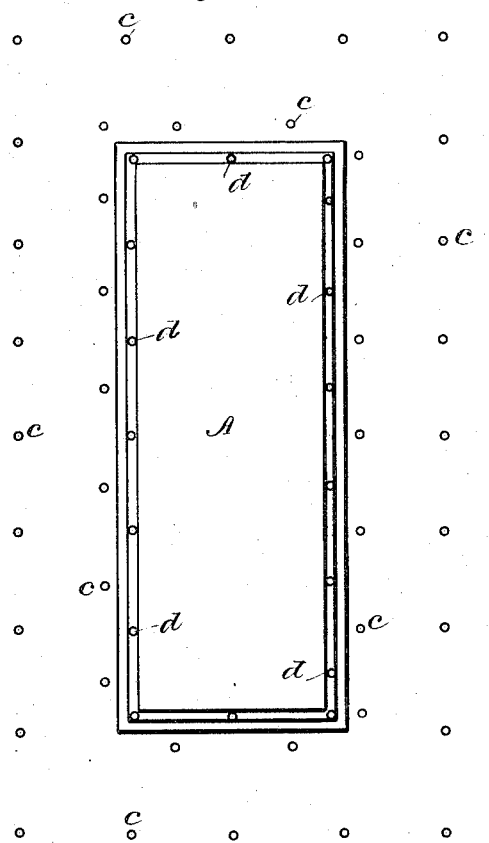

(No Model.) 2 Sheets—Sheet 1.

R. L. HARRIS.
FOUNDATION FOR PIERS OR OTHER STRUCTURES.

No. 435,142. Patented Aug. 26, 1890.

Witnesses
Chas. H. Smith
J. Stail

Inventor
Robert L. Harris
per Lemuel W. Serrell
atty (No Model.) 2 Sheets—Sheet 2.
R. L. HARRIS.
FOUNDATION FOR PIERS OR OTHER STRUCTURES.
No. 435,142. Patented Aug. 26, 1890.
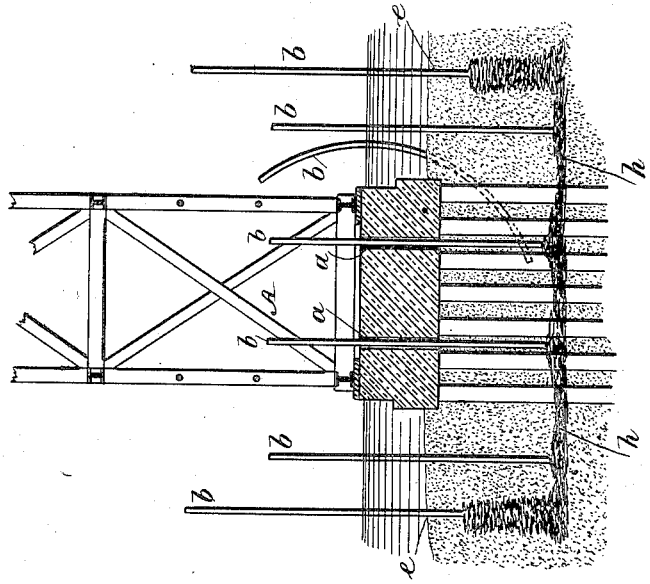
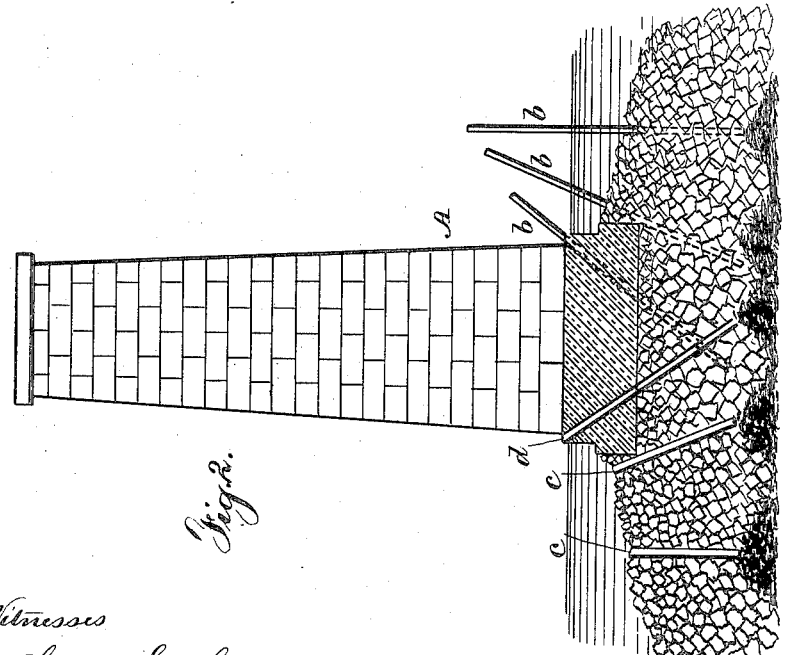

UNITED STATES PATENT OFFICE.

ROBERT L. HARRIS, OF NEW YORK, N. Y.

FOUNDATION FOR PIERS OR OTHER STRUCTURES.

SPECIFICATION forming part of Letters Patent No. 435,142, dated August 26, 1890.

Application filed May 6, 1890. Serial No. 350,806. (No model.)

*To all whom it may concern:*

Be it known that I, ROBERT L. HARRIS, a citizen of the United States, residing in the city, county, and State of New York, have invented an Improvement in Foundations for Piers, Abutments, or other Structures, of which the following is a specification.

Piers for bridges or other structures are often built to carry a much less load than afterward becomes necessary to put upon them, or it is desired to distribute the pressure upon a greater area, or in some cases imperfectly-constructed foundations sink, or in other instances coffer-dams or caissons are required around or around and under structures already built or for building new structures or repairing or strengthening old structures.

My present invention relates to a method of introducing hydraulic cement between or among materials that are already in position, so as to cement those materials together into a solid structure, and this improvement, while specially adapted to subaqueous structures, may also be used for subterraneous structures.

The principal features of this method consist in forming or forcing holes in the earth, sand, gravel, rubble, loose materials, or other substances that exist in the given position, which holes are to extend nearly as far as the cement is required to be carried. A suitable pipe or pipes are introduced into such holes and passed nearly to the distant end, and hydraulic cement in a liquid or semi-liquid state is forced through such pipe and discharged from the distant end among the loose materials and allowed quietly to accrete, and the cement-supplying tube is carried to another hole, and so to several and returned to the first hole, where the operation is repeated until the voids to be reached at the depth or location are filled by successive accretions. The number of operations and accretions, whether one or many, depends on the size of the interstices in the material operated upon or the depth or distance from the point of inlet, and the operations are repeated until a complete monolith of concrete is built up in the loose materials, commencing at the lowest or more distant points and proceeding gradually at higher levels or nearer places until the loose materials accessible from each hole are firmly cemented together. In this manner the loose materials in, under, and around bridge-piers can be cemented together without removing them from position. Loose rubble, riprap, sand, gravel, and other porous foundations can be consolidated to any required extent without disturbing the mass perceptibly, and in cases where the foundations of piers are not of sufficient area for supporting the weight such foundations can be extended indefinitely both in depth below the structure and in area around such structure, and also the side or sides and bottom of caissons can be constructed in sand, gravel, or other loose materials, and afterward excavated for the reception of masonry or rammed concrete or other work.

In the diagrams illustrating this invention I have represented a plan view in Fig. 1, and section in Figs. 2 and 3.

Let A represent a pier the foundation of which is to be strengthened. Holes are to be inserted at proper distances apart, or wherever most available—say vertically at $a\,a$—down through the loose rubble or imperfect masonry, and should there be a deposit of mud or undesirable material on the stones or other substances a powerful jet of water may be directed through such holes to wash away such mud. Then cement, mixed with water and with or without sand, according to the material to be dealt with, is forced through a straight, angular, or curved pipe $b$, inserted in such hole, and either changed from one hole to another, or separate pipes are provided for separate holes, and a quantity of such cement is forced to the bottom part of the loose materials and allowed to accrete quietly upon and between the coarse material—such as rubble or riprap—when under water. After this has set sufficiently another charge of cement is forced, and again quiet and time allowed for accretion and setting, and so on consecutively, depending on the coarseness of the material whether one or many charges have to be introduced, until the interstices to be reached at this level or position are filled, when the pipe is partially withdrawn and another similar series of operations performed, and this mode is proceeded with until the loose materials are united to the desired extent into a strong monolith or mass, and this is done without disturbing, weakening, or rebuilding the structure.

If desired, holes may be inserted at $c$ around the pier or other structure, in the sand, earth, or other materials, to deepen the foundation to any desired extent, and the holes are to be at proper distances apart, and the operations before described are performed and should be progressive and at opposite sides of the structure to balance the actions and forces.

In cases where an inclosure or caisson is required, or where it is desired to confine the existing materials, a cement wall may be built gradually by the before-described method within the materials as they lie in their natural positions, the cement, under pressure, being forced through holes at $e$ $e$ progressively, and said holes being near enough to each other for the cement spread from one to bond with the cement spread from the next, until a complete wall of the desired thickness is produced, and if a floor is required for said caisson, as at $h$, the same may be made by cement forced through pipes introduced into holes made to a nearly-uniform depth, the cement from one hole spreading to and bonding with the cement from the adjacent holes.

I find it advantageous to mix more or less sand with the hydraulic cement, according to the character of the loose materials to be united together, and in passing the cement to its point of delivery it is important to do so with rapidity and to keep the cement violently agitated to maintain uniformity of intermixture with the water and sand immediately before delivery to the pump or other forcing apparatus, in order that the materials may not subside in and clog the forcing apparatus or pipes.

This invention may be availed of in supporting the roof and walls of earth in constructing tunnels, as well as in making foundations, or in repairing or strengthening foundations and other structures, and in sinking shafts, especially in wet or unstable materials or quicksands, such materials may be cemented together in advance of the excavation by the before-described method.

In subaqueous structures water may be pumped from a pipe introduced into the hole that is made, so as to draw out with the water the earthy and soluble materials before forcing down the cement in between the gravel, stones, or similar materials around the end of the pipe. In some instances, where the foundation is of loose material, the hose, nozzle, or pipe may be inserted without making a hole especially for it at whatever places may be most advantageous. With riprap and rubble under water, the cement is liable to be carried away by the water if introduced in a large quantity at a time. It is better under these circumstances to supply a comparatively small quantity of cement at a time, so as to allow it to subside and accrete upon the stones or other open material, and as soon as this has set to add more cement until the interstices are filled and the stones cemented together. If the foundation below a stone structure is defective, holes may be drilled through the stone, as seen at $d$, Fig. 2, for the insertion of the cement-supplying pipe or nozzle $b$. If the riprap or coarse materials are sufficiently open for the insertion of the cement-supplying nozzle or pipe, it is not necessary to make holes for the same, and the cement may be introduced progressively at the various points until the desired accretion has been obtained.

By the term "cement" as used herein is included hydraulic cement or any proper mixture of adhesive material adapted to the place where the same is to be used.

I claim as my invention—

1. The method herein specified of constructing, consolidating, or strengthening foundations or structures, the same consisting in forcing into the interstices of such foundation or adjacent thereto successive charges of mixed cement, commencing at the bottom and adding thereto progressively from the bottom upwardly until the mass is solidified, substantially as specified.

2. The method herein specified of progressively making artificial-stone foundations or structures in loose materials remaining in position, the same consisting in making holes between such loose materials and introducing thinly-mixed cement through a pipe or pipes under pressure to the distant portions of such holes, to cause the cement to spread in between the loose materials, allowing the cement to accrete or set, and then repeating the operation at nearer points in such holes until a solid cement structure is built up in the loose materials, substantially as set forth.

3. The method herein specified of cementing together loose materials—such as rubble, riprap, gravel, and imperfect masonry—consisting in directing streams of water through such materials to remove mud or sediment and introducing cement in successive charges through holes, commencing at the bottom and filling it upwardly, and allowing the successive charges of cement to set or to accrete between one charge and the next in order to fill the interstices progressively, substantially as set forth.

4. The method herein specified of building a caisson or a coffer-dam or supporting structure in sand, earth, or loose materials, consisting in making holes from above in such materials and forcing cement into the same under pressure at the lowest desired places and building by successive operations from the lowest desired level upwardly, the holes being sufficiently close together for the cement spread laterally by the pressure at one hole to extend to and bond with the cement from the adjoining holes, substantially as set forth.

5. The method herein specified of introducing a floor or supporting-layer into rubble, sand, or other loose material without removing the same, consisting in introducing into such material at numerous places or holes cement in a semi-liquid condition, forced through pipes passing down to the same or nearly the same level and the places of supply being sufficiently close together for the cement introduced at one hole to spread to and unite with the cement introduced at adjacent holes, substantially as specified.

6. The method herein specified of making a caisson under water with bottom and walls of cement, consisting in forcing such cement through pipes and into the loose materials existing under the water and in their normal condition, such cement being first introduced at the lowest places and sufficiently close for the cement to spread and unite and form the floor, and then building up the walls progressively from the floor to the higher places, substantially as specified.

Signed by me this 26th day of April, A. D. 1890.

ROBERT L. HARRIS.

Witnesses:
GEO. T. PINCKNEY,
WILLIAM G. MOTT.